US011133980B2

(12) United States Patent
Shaw et al.

(10) Patent No.: US 11,133,980 B2
(45) Date of Patent: *Sep. 28, 2021

(54) DETECTING SOURCES OF COMPUTER NETWORK FAILURES

(71) Applicant: Twitter, Inc., San Francisco, CA (US)

(72) Inventors: Anatole Shaw, Great Neck, NY (US); Anthony Roberts, San Francisco, CA (US); Berk D. Demir, Menlo Park, CA (US); Christopher Chen, Portland, OR (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,174

(22) Filed: Mar. 12, 2020

(65) Prior Publication Data

US 2020/0213186 A1    Jul. 2, 2020

Related U.S. Application Data

(63) Continuation of application No. 15/809,836, filed on Nov. 10, 2017, now Pat. No. 10,601,644.

(51) Int. Cl.
*H04L 12/24* (2006.01)
*H04L 12/26* (2006.01)
(Continued)

(52) U.S. Cl.
CPC ........ *H04L 41/0695* (2013.01); *H04L 43/026* (2013.01); *H04L 43/0811* (2013.01);
(Continued)

(58) Field of Classification Search
CPC ............... H04L 41/0695; H04L 43/026; H04L 43/0811; H04L 43/10; H04L 43/16;
(Continued)

(56) References Cited

U.S. PATENT DOCUMENTS 7,940,695 B1    5/2011  Bahadur et al.
8,224,942 B1 *  7/2012  Presotto ................. H04L 43/16
                                              709/223
(Continued)

OTHER PUBLICATIONS

Brendan Gregg's Blog, "Linux ftrace TCP Retransmit Tracing," Sep. 6, 2014, [Retrieved on May 8, 2017], Retrieved from the Internet: <http://www.brendangregg.com/blog/2014-09-06/linux-ftrace-tcp-retransmit-tracing.html >. 5 pages.
(Continued)

*Primary Examiner* — Ian N Moore
*Assistant Examiner* — Latresa A McCallum
(74) *Attorney, Agent, or Firm* — Fish & Richardson P.C.

(57) ABSTRACT

Methods, systems, and apparatus, including computer programs encoded on computer storage media, for detecting sources of computer network failures. One of the methods includes identifying a network flow in a computer network between a source and a destination; performing a first probe to determine whether there is end-to-end connectivity between the source and the destination; in response to determining that there is no end-to-end connectivity between the host and the destination, performing one or more additional probes including a second probe to determine whether each hop in the path of the network flow between the source and the destination is operational including requesting that the source transmit a respective first trace diagnostic packet to each hop in the path of the network flow; and determining whether at least one link of the computer network that is part of the path of the network flow has failed based on the results.

21 Claims, 11 Drawing Sheets

(51) Int. Cl.
*H04L 12/931* (2013.01)
*H04L 12/947* (2013.01)

(52) U.S. Cl.
CPC ............. *H04L 43/10* (2013.01); *H04L 43/16* (2013.01); *H04L 49/25* (2013.01); *H04L 49/50* (2013.01); *H04L 41/0677* (2013.01)

(58) Field of Classification Search
CPC ..... H04L 49/25; H04L 49/50; H04L 41/0677; H04L 41/12; H04L 43/50; G06F 11/0751
See application file for complete search history.

(56) References Cited

U.S. PATENT DOCUMENTS

| | | | |
|---|---|---|---|
| 8,531,954 B2 | 9/2013 | McNaughton et al. | |
| 2005/0207410 A1* | 9/2005 | Adhikari | H04L 69/22 370/389 |
| 2006/0098586 A1* | 5/2006 | Farrell | H04L 45/02 370/254 |
| 2008/0052394 A1 | 2/2008 | Bugenhagen et al. | |
| 2009/0198832 A1 | 8/2009 | Shah et al. | |
| 2010/0097931 A1* | 4/2010 | Mustafa | H04L 43/087 370/235 |
| 2011/0286447 A1* | 11/2011 | Liu | H04L 45/74 370/389 |
| 2013/0128751 A1 | 5/2013 | Keesara et al. | |
| 2015/0124629 A1* | 5/2015 | Pani | H04L 61/2007 370/248 |
| 2019/0149398 A1 | 5/2019 | Shaw et al. | |

OTHER PUBLICATIONS

Microsoft Research Blog, "Microsoft Azure and Microsoft Research take giant step towards elimination network downtime," Oct. 31, 2017, [Retrieved on Dec. 19, 2017]. Retrieved from the Internet: URL <https://www.microsoft.com/en-us/research/blog/eliminating-network-downtime/>, 5 pages.

PCT International Search Report and Written Opinion in International Application No. PCT/US2018/060190, dated Mar. 4, 2019, 18 pages.

PCT International Preliminary Report on Patentability in International Application No. PCT/US2018/060190, dated May 12, 2020, 12 pages.

\* cited by examiner

DETECTING SOURCES OF COMPUTER NETWORK FAILURES

CROSS-REFERENCE TO RELATED APPLICATIONS

This application is a continuation application of, and claims priority to, U.S. patent application Ser. No. 15/809,836, filed on Nov. 10, 2017, and now U.S. Pat. No. 10,601,644. The disclosure of the foregoing application is incorporated here by reference.

BACKGROUND

This specification relates to detecting sources of computer network failures.

A typical computer network includes multiple computers connected together through one or more links and one or more network devices, e.g., switches or routers. Computer networks can experience partial or total failure for many reasons, including the failure of one or more components of the computer network. For example, the failure of some links in a computer network can cause problems in transmitting certain network flows. The diagnostic logic of network devices in the network may fail to detect such link failures, which in turn can cause a situation where the computer network continues to use failed links for packet forwarding. Detecting sources of computer network failures may be difficult because it may not be practicable or feasible to investigate every component of a computer network. This is especially the case for larger networks with numerous hosts, links, and switches.

SUMMARY

In general, this specification describes techniques for detecting sources of network failures. In particular, this specification describes techniques that use end-to-end probing with diagnostic packets formatted in a manner that cause switches to forward the diagnostic packets along the same path of packets of a particular network flow. This specification further describes techniques that use trace probing with diagnostic packets formatted in a manner that causes hops on their path to send a response to the diagnostic packet to the source host.

In general, one innovative aspect of the subject matter described in this specification can be embodied in methods that include the actions of identifying a network flow in a computer network between a source and a destination; performing a first probe to determine whether there is end-to-end connectivity between the source and the destination including requesting that the source transmit an end-to-end diagnostic packet to the destination, wherein the end-to-end diagnostic packet includes information that causes one or more network devices in the computer network to forward the end-to-end diagnostic packet on the path of the network flow; in response to determining that there is no end-to-end connectivity between the host and the destination, performing one or more additional probes including a second probe to determine whether each hop in the path of the network flow between the source and the destination is operational including requesting that the source transmit a respective first trace diagnostic packet to each hop in the path of the network flow, each trace diagnostic packet having information that cause the respective hop to send a first trace response packet responsive to the first trace diagnostic packet to the source; and determining whether at least one link of the computer network that is part of the path of the network flow has failed based on the results of the first probe and the one or more additional probes. Other embodiments of this aspect include corresponding computer systems, apparatus, and computer programs recorded on one or more computer storage devices, each configured to perform the actions of the methods.

This specification uses the term "configured" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The foregoing and other embodiments can each optionally include one or more of the following features, alone or in combination. In particular, one embodiment includes all the following features in combination. Performing the one or more additional probes includes performing a third probe to determine whether each hop in a path between the destination and the source is operational including requesting that the destination transmit a respective second trace diagnostic packet to each hop in the path between the destination and the source, each trace diagnostic packet having information that cause the respective hop to send a second trace response packet responsive to the second trace diagnostic packet to the source host. The second trace diagnostic packet associated with a respective host has a particular value in a time-to-live field of the second trace diagnostic packet that causes the hop to send a time exceeded message to the host in response to the second trace diagnostic packet. The end-to-end diagnostic packet has a source identifier field and a destination identifier field that include identifiers of the source and destination respectively. The end-to-end diagnostic packet has specified values in one or more particular fields to indicate that the end-to-end diagnostic packet is a diagnostic packet. The diagnostic packet is a Transport Control Protocol packet, and wherein the specified values comprise zero values for a flags field. The first trace diagnostic packet associated with a respective hop has a particular value in a time-to-live field of the first trace diagnostic packet that causes the hop to send a time exceeded message to the host in response to the first trace diagnostic packet.

Performing the first probe further includes: determining whether the source has received an end-to-end response packet responsive to the end-to-end diagnostic packet; in response to determining that the source has received the end-to-end response packet, determining that there is end-to-end connectivity between the source and the destination; and in response to determining that the source has not received the end-to-end response packet, determining that there is no end-to-end connectivity between the source and the destination.

The method further includes: determining whether the source has received the first trace response packet from a particular hop; in response to determining that the source has received the first trace response packet from a particular hop, determining that the particular hop is operational; and in response to determining that the source has not received the first trace response packet from a particular hop, determining that the particular hop is not operational.

Identifying the network flow includes: obtaining retransmission information from one or more hosts in the computer network; analyzing the re-transmission information to detect one or more network flows; for each network flow of the one or more network flows, determine a re-transmission count from the re-transmission information; identify a group of the one or more network flows whose re-transmission count exceeds a threshold; and selecting the network flow from the group. Identifying the network flow further includes: for each network flow in the group, detecting if a destination of the network flow has failed; and updating the group to exclude any network flow whose corresponding destination has failed.

The method further includes generating probe result information that include results of the first probe, the second probe, and the third probe; analyzing the probe results to determine a visit count and a failure count for each link in the network, the visit count for a corresponding link indicating a number of times that packets have traveled the link and the failure count for a corresponding link indicating a number of times that the link has shown signs of failure; and generating a graph of the computer network, the graph including edges that each correspond to a respective link in the computer network and weights for each edge that are determined based on at least one of the visit count and the failure count for the link corresponding to the edge. The method further includes analyzing the graph to detect at least one link in the computer link that has likely failed.

In general, one innovative aspect of the subject matter described in this specification can be embodied in methods that include the actions of obtaining retransmission information from one or more hosts in a computer network; analyzing the re-transmission information to detect one or more network flows; for each network flow of the one or more network flows, determine a re-transmission count from the re-transmission information; identify a group of the one or more network flows whose re-transmission count exceeds a threshold; and generating one or more network diagnostic conclusions about the identified group. Other embodiments of this aspect include corresponding computer systems, apparatus, and computer programs recorded on one or more computer storage devices, each configured to perform the actions of the methods.

Particular embodiments of the subject matter described in this specification can be implemented so as to realize one or more of the following advantages. Computer networks can be probed for failures associated with particular network flows. The accuracy of network diagnostic results can be improved by active probing while limiting the amount of active probing that needs to be performed. Data from network diagnostics can be processed in a manner that allows for graph-based inferences and calculations. Performance of more computationally intensive probing tasks can be limited by selecting network flows on which those tasks will be performed using less computationally intensive probing methods and passive methods that do not probe the network, thus reducing the overall cost of performing network diagnostics.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
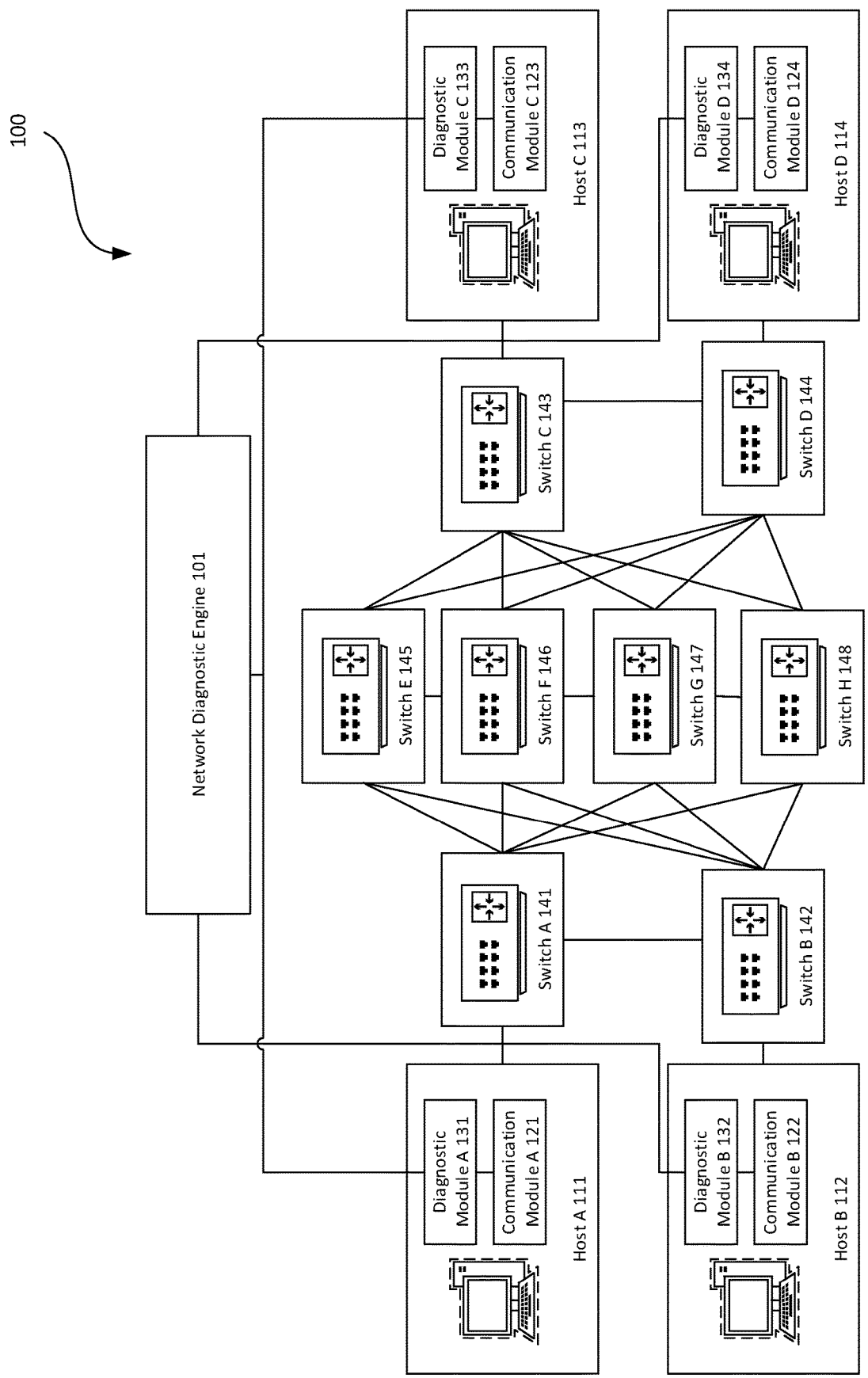
FIG. 1 is a block diagram of an example computer network including a network diagnostic engine.

FIG. 1 is a block diagram of an example computer network 100 including a network diagnostic engine 101. The network diagnostic engine 101 is a system of one or more computers on which the techniques described in this specification can be implemented. The computer network 100 may be, for example, a network used to connect multiple data server hosts in a distributed data center.

The network diagnostic engine 101 monitors availability and reliability of one or more components, e.g., switches, host computers, and/or links, of the computer network 100. The network diagnostic engine 101 can request that host computers in the computer network 100 perform certain functionalities and obtain information from host computers about status of the computer network 100. The network diagnostics engine 101 can use the information obtained from the host computers to detect one or more components of the computer network 100 that may be experiencing difficulties. In some implementations, the network diagnostic engine 101 can use the information to generate a representation, e.g., a graph, of information about usage and/or reliability of one or more components of the computer network 100. An example network diagnostic engine 101 is described in greater detail below with reference to FIG. 2.

The computer network 100 includes multiple host computers, i.e., host A 111, host B 112, host C 113, and host D 114. The host computers are connected to each other through multiple switches, i.e., switch A 141, switch B 142, switch C 143, switch D 144, switch E 145, switch F 146, switch G 147, and switch F 148. Two switches or a switch and a host are connected to each other through a link in the computer network 100. A link is a physical connection that may correspond to an interface in a switch.

Each host has a communication module, specifically, communication Module A 121 in host A 111, communication Module B 122 in host B 112, communication Module C 123 in host C 113, and communication Module D 124 in host D 114. The communication module in a given host sends communication packets, e.g., transport control protocol (TCP) packets or user datagram protocol (UDP) packets, from the host to a switch and receives communication packets to the host from a switch.

A switch is an example computer networking device that receives, processes, and forwards communication packets in a computer network. While this specification refers to switches, the techniques described in this specification may apply to computer networks that use other types of computer networking devices capable of receiving, processing, and forwarding communication packets in a computer network, such as routers and Ethernet hubs.

Each switch can receive communication packets from one or more host computers and/or one or more other switches. When a switch receives a communication packet, the switch selects a feasible path for forwarding the packet and, based on the selected path for the packet, determines a next hop, i.e., host or switch, to forward the packet to. For example, if switch A 141 receives a packet from host A 111 intended for host D 114, switch A can choose the path Switch A 141→Switch E 145→Switch D 144→host D 114 for the packet and forward the packet to Switch E 145, the next hop in the selected route.

In some situations, the switch may determine that there are multiple feasible paths between a source host and a destination host. For example, if switch A 141 receives a packet from host A 111 intended for host D 114, switch A 141 can determine that the path Switch A 141→Switch E 145→Switch D 144→host D 114, the path Switch A 141→Switch F 146→Switch D 144, and many other paths are feasible paths to forward the packet from source host A 111 to destination host D 114.

The switch can use a forwarding algorithm to select a path to forward a packet when there are multiple available paths between the source and the destination of the packet. While a forwarding algorithm can select any path between the source and the destination for a packet, some forwarding algorithms aim to route packets associated with a network flow along a same path. A network flow can be characterized by communication between a source host and a destination host within a particular time frame.

In some implementations, the forwarding algorithm uses information from a packet header to select a route. For example, the forwarding algorithm can use identifiers, e.g., internet protocol (IP) addresses, of a source and a destination of the communication packet, an identifier of a source and destination port (such as a source TCP port and a destination TCP port) of the communication packet, and a transport protocol identifier of the communication, to select a route. For example, the switch may apply a switch-specific hashing function to the IP addresses of the source and the destination, the source and destination TCP ports, and the transport protocol identifier of a communication packet to generate a hash value for the packet, and use the hash value to select a path between the source and the destination of the packet among multiple feasible paths. As a result, the forwarding algorithm will route all packets of a given network flow between the source and the destination hosts along the same path.

Some forwarding algorithms that use an identifier of the source and destination of a communication packet to select a path to forward a packet also rely on a forwarding strategy called equal-cost, multi-path forwarding (ECMP). A switch using ECMP may obtain an estimate of a cost associated with each feasible path between a source and a destination of a communication packet, e.g., based on the number of links between hops that the packet would have to pass to reach the destination and an estimated cost associated with each link (e.g., determined based on a length and/or speed of the link), and select a path having a lowest estimate of cost to forward the packet. If there are multiple lowest-cost paths available between the source and destination host, the switch may choose a lowest cost path based on one or more additional factors, such as the identifier of the source and the destination of the communication packet, the identifier of the source and destination ports for the communication packet, and the transport protocol identifier. For example, the switch may hash the identifier of the source communication packet, the identifier of the destination communication packet, the identifier of the source port, the identifier of the destination port, and the identifier of the transport protocol. The switch may use the resulting hash value to select a path between the source and the destination of the packet among multiple lowest-cost paths. This forwarding technique can cause the computer network 100 to distribute packets among multiple paths of equal cost and reduce the possibility of overloading a particular path. This forwarding technique can also cause the computer network 100 to forward communication packets belonging to a particular network flow along the same path at least for a period of time.

Each host includes a diagnostic module, i.e., i.e., diagnostic Module A 121 in host A 111, diagnostic Module B 122 in host B 112, diagnostic Module C 123 in host C 113, and diagnostic Module D 124 in host D 114. A diagnostic module in a host executes functionalities requested by the network diagnostic engine 101 and provides information to the network diagnostic engine 101 about a status of the computer network 100.

For example, the network diagnostic engine 101 can request that a diagnostic module on a host sends, e.g., using the communications module of the host, a diagnostic packet from the host to a particular destination. The diagnostic module can obtain information about the transmission of a diagnostic packet within the computer network 100, e.g., based on communication packets received in response to the packet, and provide the obtained information to the network diagnostic engine 101. The transmission and reception of diagnostic packets is described in greater detail below.

Figure 2:
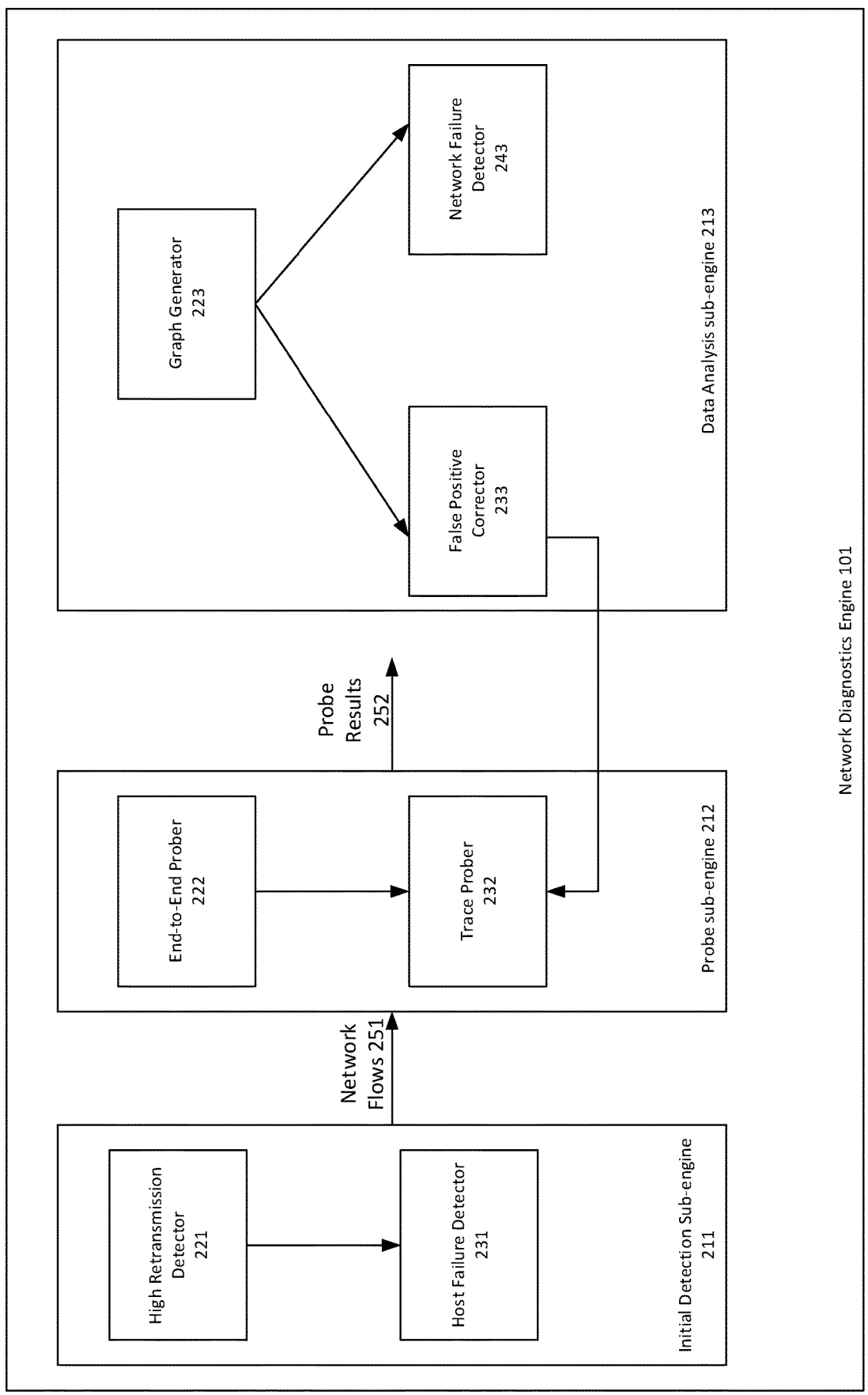
FIG. 2 is a block diagram of an example network diagnostic engine.

FIG. 2 is a block diagram of an example network diagnostic engine 101. The network diagnostic engine 101 includes an initial detection sub-engine 211, a probe sub-engine 212, and a data analysis sub-engine 213.

The initial detection sub-engine 211 detects one or more network flows 251 that the probe sub-engine 212 can probe. A network flow is a flow of communication packets between a source and a destination. The computer network 100 may transmit packets pertaining to many network flows. Probing a network flow using the probe sub-engine 212 can be a computationally intensive task. By reducing the number of network flows that the probe sub-engine 212 needs to probe, the initial detection sub-engine 211 can increase the efficiency of the network diagnostic engine 101.

The initial detection sub-engine can include a high re-transmission detector 221 and a host failure detector 231. The high re-transmission detector 221 receives information about packet retransmissions for network flows from one or more hosts and processes the obtained information to determine one or more network flows whose retransmission count exceeds a threshold value. The high re-transmission detector 221 may determine that such high-retransmission network flows require further investigation for potential problems and can transmit identifiers of those network flows to the host failure detector 231 or to the probe sub-engine 212. Detecting network flows having high retransmission counts is described in greater detail below with reference to FIG. 6.

The host failure detector 231 determines whether a particular host involved in transmitting or receiving network flow, for example a network flow with high re-transmission as detected by the high re-transmission detector 221 and/or a network flow having other particular properties as detected by one or more detection techniques, has failed. The host failure detector 231 can request that a host, e.g., the source host, send a status inquiry packet to the particular host and obtain information from the source host about whether the source host has received a response to the status inquiry packet. The host can send the status inquiry packet over one or more possible paths in the computer network 100, including paths that are different than a path associated with a network flow between the source host and the destination host. Because of the information used by the forwarding algorithm, the paths for transmitting the status inquiry packet most likely include paths different than a path associated with a network flow between the source host and the destination host. The host failure detector 231 can process the obtained information to determine if the particular host has failed. Detecting a host failure is described in greater detail below with reference to FIG. 7.

When the host failure detector 231 determines that a host associated with a network flow has failed, the network diagnostic engine 101 can determine that a host failure (as opposed to other network failures such as a failure of switches and/or links) is a likely reason for any signs of problematic performance, e.g., high retransmission count, associated with the network flow. Therefore, the network diagnostic engine 101 can exclude the network flow affected by host failure from a group of network flows being probed by the probe sub-engine 212. This can further limit the group of network flows that need to be probed by the probe sub-engine 212 and thus increase the efficiency of the network diagnostic engine 101.

The probe sub-engine 212 performs at least one of two types of probing on the network flows 251: "end-to-end probing" and "trace probing." End-to-end probing is performed by an end-to-end prober 222 of the probe sub-engine 212. Trace probing is performed by a trace prober 232 of the probe sub-engine 212. The probe sub-engine transmits results 252 of the probes to a data analysis sub-engine 213.

The end-to-end prober 222 requests that a source host sends an end-to-end diagnostic packet to a destination host and obtains information about whether the source host has determined that the destination host has received the end-to-end diagnostic packet. The network diagnostic engine 101 can process the obtained information to determine if a network flow transmitted along the same path as the diagnostic packet has end-to-end connectivity between the source and the destination of the network flow. If the network diagnostic engine 101 determines that a network flow does not have such end-to-end connectivity, the end-to-end prober 222 can request that the trace prober 232 further probe the path taken by the network flow using trace probing.

The trace prober 232 requests that a host sends a trace diagnostic packet for every expected hop in a path corresponding to a network flow and obtains information about whether each expected hop has received a corresponding trace diagnostic packet. The network diagnostic engine 101 can process the obtained information to determine whether any link in the path has failed. End-to-end probing and trace probing are described in greater detail below with reference to FIG. 3.

The data analysis sub-engine 213 receives the probe results 252 from the probe sub-engine 212 and can analyze the probe results 252. Analysis can include providing particular output results or generating a representation of availability and reliability of components of the computer network 100 and detect one or more components of the computer network 100 that may be experiencing difficulties.

The data analysis sub-engine 213 can include a graph constructor 223, a false positive corrector 233, and a network failure detector 243. The graph constructor 223 processes the probe results 252 to generate a graph. The graph includes edges corresponding to links in the computer network 100, nodes corresponding to switches and optionally hosts in the computer network 100, and edge weights corresponding to an estimate of reliability of the link. Generating a graph is described in greater detail below with reference to FIG. 8.

The graph constructor 223 can determine the estimate of reliability for a link based on a count of diagnostic packets observed to have traveled the link, i.e., a visit count for the link, and a count of packets observed to have been lost on the link, i.e., a failure detector for the link. This may lead to situations where the graph constructor 223 determines that a link has a low estimate of reliability because the link has a low visit counter. However, in some situations, a low visit counter for a link can result from a low utilization of the link in the normal course of network 100 activity and not from a failure of the link. To correct such false positive detections, the false positive detector 233 can detect low utilization links, e.g., by detecting links whose visit count is below a threshold. The false positive detector 223 can then request that the trace prober 232 of the probe sub-engine 233 generate trace diagnostic packets for network flows whose corresponding path includes the low utilization links in order to increase network 100 activity on those links and increase the accuracy of the probe results 252.

The network failure detector 243 obtains the graph generated by the graph constructor 223 and analyzes estimates of reliability for the links in the graph to detect links that are likely to have failed. In some implementations, the network failure detector 243 determines that links whose estimate of reliability falls below a threshold likely have failed.

Figure 3:
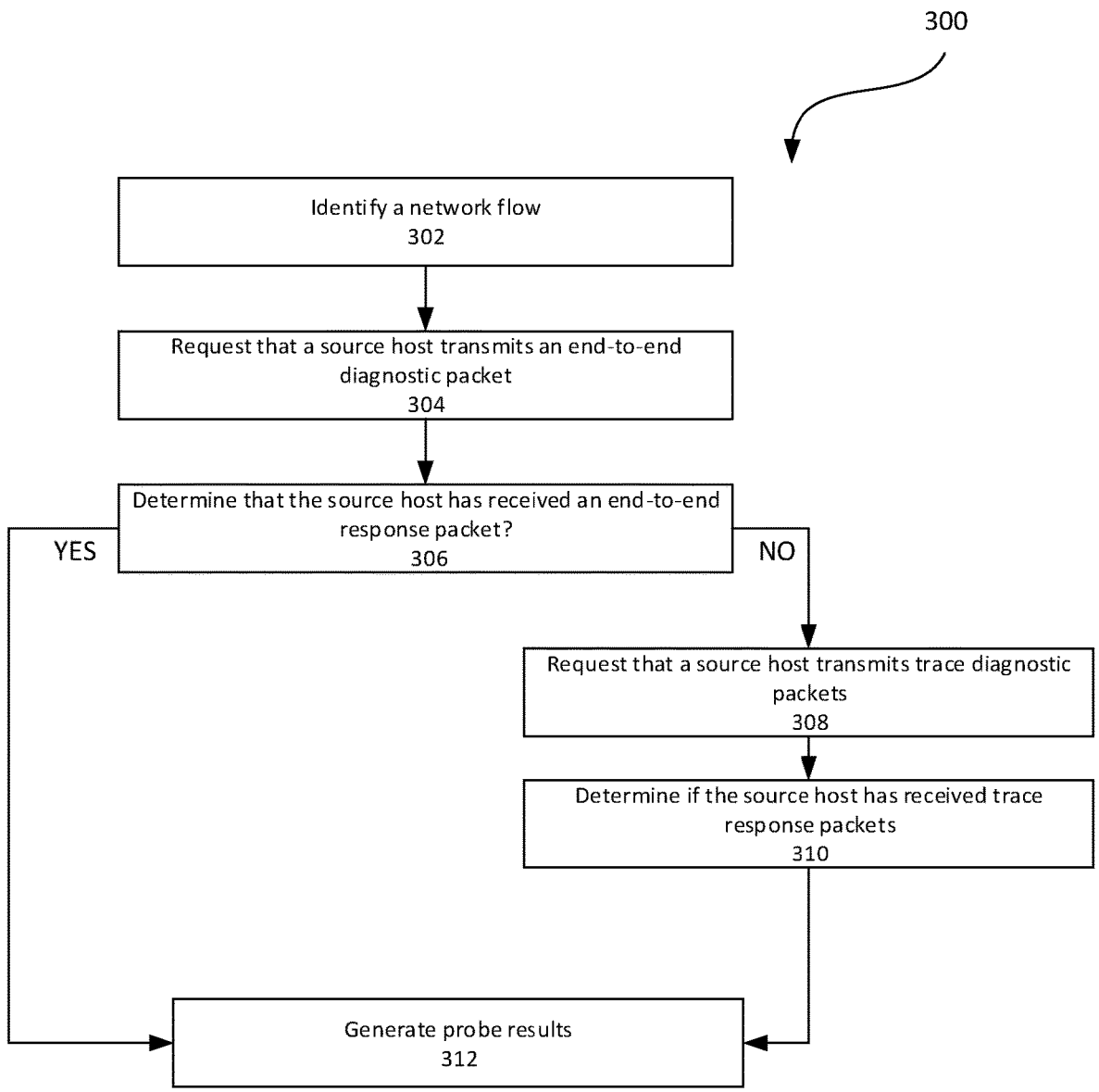
FIG. 3 is a flow diagram of an example process for performing an end-to-end probe followed by a trace probe.

FIG. 3 is a flow diagram of an example process for performing an end-to-end probe followed by a trace probe. The process can be performed by a system of one or more computers, e.g., the network diagnostic engine 101 of FIG. 1.

The system identifies a network flow (302) and requests that a source host associated with the network flow transmit an end-to-end diagnostic packet corresponding to the network flow to a destination host associated with the network flow (304). For example, the network flow can be identified based on analyzing retransmission information obtained from one or more hosts to identify candidate flows for further investigation.

The end-to-end diagnostic packet should have a particular format that causes switches to forward the packet along the same path as a path corresponding to the monitored network flow. For example, if the switches use an identifier of the source and destination of a packet to select a path to forward the packets of the flow, an end-to-end diagnostic packet is configured to have the same source and destination identifiers as the source and destination identifiers characterizing the particular network flow. This causes the diagnostic packet to be forwarded along the same path as the corresponding network flow. Without ensuring that the packet will follow the same path as packets of the flow, the diagnostic packet could be sent along a different path from the source host to the destination host. Thus, it would otherwise be difficult to determine whether there was a problem along the particular path of the flow. The format of the end-to-end diagnostic packet for a network flow is also configured to be distinct from the format of a regular packet of the network flow in a way that allows a program on the destination host, e.g., a diagnostic engine on the destination host, to determine that the packet is a diagnostic packet (and not a normal packet in the flow) and thus send a corresponding diagnostic packet in response. For example, the end-to-end diagnostic packet can have specified values, e.g., zero values, in certain fields. This can cause the packet to be ignored by a communications module of the destination host and thus not interfere with the transmission of normal packets of a network flow. The format of an example end-to-end diagnostic TCP packet is described in greater detail below with reference to FIG. 5A.

The system determines if the source host has received an end-to-end response packet (306). The end-to-end response packet is an indication that the destination host, e.g., a diagnostic module in the destination host, has received the end-to-end diagnostic packet. The end-to-end response packet is configured to have a format that indicates that it: (1) is a diagnostic packet and not a normal network flow packet (e.g., by having specified values in certain fields); and (2) is in response to the end-to-end diagnostic packet (e.g., by having source and destination identifiers that correspond to the destination and source identifiers of the end-to-end diagnostic packet respectively). The format of an example end-to-end diagnostic TCP packet is described in greater detail below with reference to FIG. 5B.

If the system determines that the source host has received the end-to-end response packet, it generates probe results (316) based on the results of the end-to-end probe performed in steps 304 and 306. However, if the system determines that the source host has not received the end-to-end response packet, the system decides that the network flow needs further probing in the form of a trace probe by the source host along the path of the end-to-end diagnostic packet (steps 308 and 310). After performing the trace probe, the system generates the probe results (312) based on the results of the end-to-end probe and the trace probe.

To perform the trace probe, the system requests that the source host transmit a trace diagnostic packet (308) corresponding to each expected hop, e.g., host and switch, in a path between the source host and the destination host and determines if the source host has received a trace response packet corresponding to each trace diagnostic packet (310). A trace response packet corresponding to a trace diagnostic packet is an indication that the expected hop corresponding to the trace diagnostic packet has received the trace response packet.

Each trace diagnostic packet corresponding to a particular hop is configured to have a particular format that: (1) can cause the particular hop to send a trace response packet corresponding to the trace diagnostic packet; and (2) has identifying information that the corresponding hop can put in the trace response packet to identify the trace diagnostic packet being responded to. Each trace response packet in turn has a particular format that includes identifying information of a corresponding trace diagnostic packet.

For example, a trace diagnostic packet corresponding to a hop can be a TCP or UDP packet whose time-to-live (TTL) field has been set by the source host such that it will expire at the hop and cause the hop to send a trace diagnostic response in the form of a time-exceeded message. A time-exceeded message is an example of an internet control message protocol (ICMP) message that can contain a collection of by bits, e.g., the first 64 bits, of a packet that triggered the time exceeded message, i.e., the corresponding trace diagnostic packet. Therefore, the identifying information of the trace diagnostic packet can be in a portion of the trace diagnostic packet that the system includes as a portion of the time exceeded message. For example, if the time exceeded message includes the first 64 bits of the packet that triggered the time exceeded message, the identifying information of a trace diagnostic packet can be in the first 64 bits of the trace diagnostic packet, e.g., in the sequence number of a TCP packet or the length field of a UDP packet, so that the system will include those identifying information in the time exceeded message. Some of the length values for IP header fields noted in this specification refer to a format of communications packets that follow the version 4 of the IP protocol (IPv4). Other versions of the IP protocol may use other formats.

An example TCP trace diagnostic packet is described in greater detail below with reference to FIG. 5C. An example ICMP trace response packet is described in greater detail below with reference to FIG. 5D.

Figure 4B:
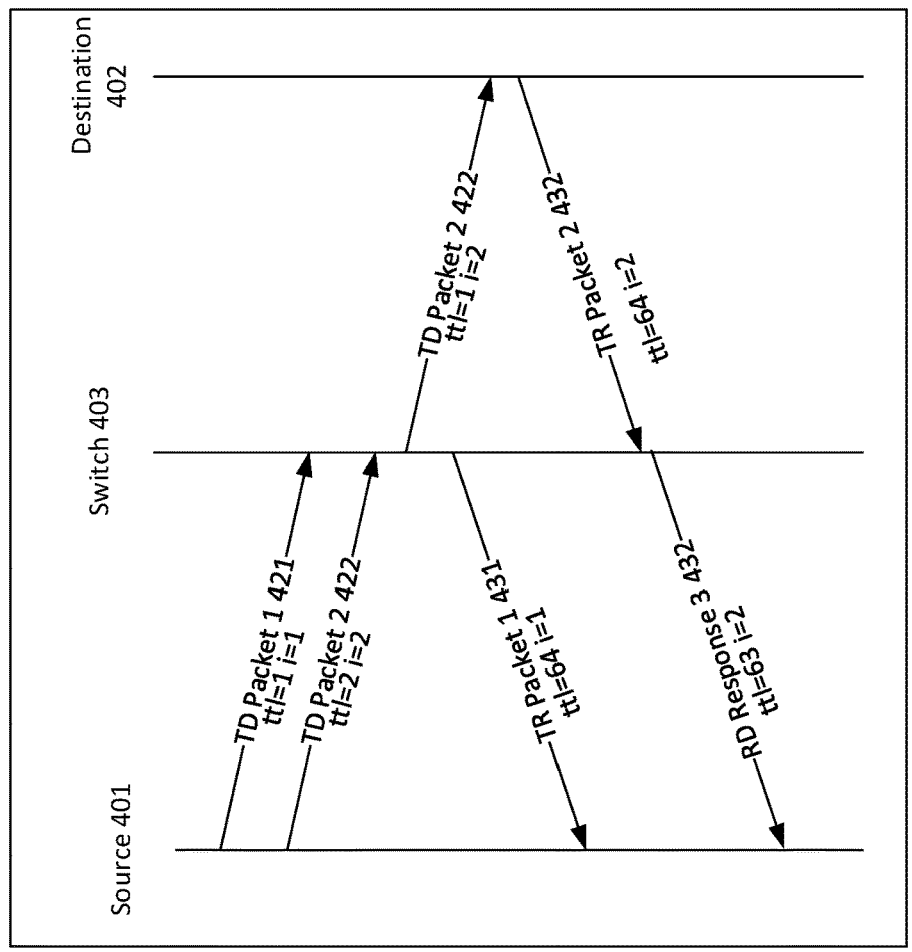
FIGS. 4A and 4B are data flow diagrams for an end-to-end probe and a trace probe respectively.
Figure 4A:
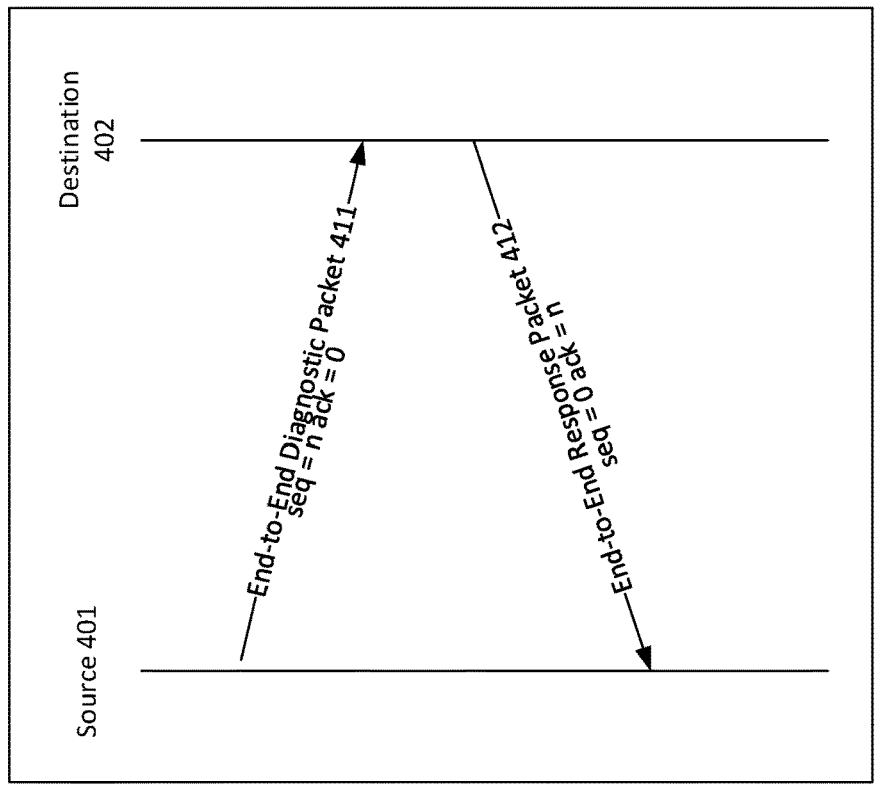

FIGS. 4A and 4B are data flow diagrams for an end-to-end probe and a trace probe respectively. FIG. 4A depicts an end-to-end diagnostic packet 411 sent from a source host 401 to a destination host 402 and a corresponding end-to-end response packet sent from the destination host 402 to the source host 401. The source host 401 can send the end-to-end diagnostic packet 411 as part of a sequence of packets and thus with a sequence number. The destination host 402 can send the end-to-end response packet 412 as a single packet of a sequence with an acknowledgement number that corresponds to the sequence number of the end-to-end diagnostic packet 411.

FIG. 4B depicts two trace diagnostic packets sent from the source host 401. The first one, trace diagnostic packet 1 421, has a TTL value of 1 and thus decrements and expires at the first hop on its route, i.e., the switch 403. The second trace diagnostic packet, i.e., trace diagnostic packet 422, has a TTL value of 2, and thus gets transmitted to the destination host 402 by the switch 403. The second trace diagnostic packet 422 then expires at the destination host 402.

FIG. 4B also depicts two trace response packets. In response to the first trace diagnostic packet 421, the switch 403 sends a first trace response packet, i.e., trace response packet 1 431, with an arbitrary TTL value, e.g., 64, to the source host 401. In response to the second trace diagnostic packet 422, the destination host 402 sends a second trace diagnostic packet, i.e., trace diagnostic packet 2 432, with an arbitrary TTL value to the source host 401. The switch 403 receives and transmits the second trace response packet 432 to the source host 401.

FIGS. 5A-5D are example representations of diagnostic packets. All the diagnostic packets illustrated have an IP header 501 that includes a 32-bit source address field 521, a 32-bit destination address field 523, and an 8-bit TTL field 518. The source address field 521 includes an identifier of the source of the packet and the destination address field 522 includes an identifier of the destination of the packet. The TTL field 518 is decremented at each hop and, when it reaches zero at a hop before destination, causes a hop to send a time exceeded message to the source of the packet.

Figure 5A:
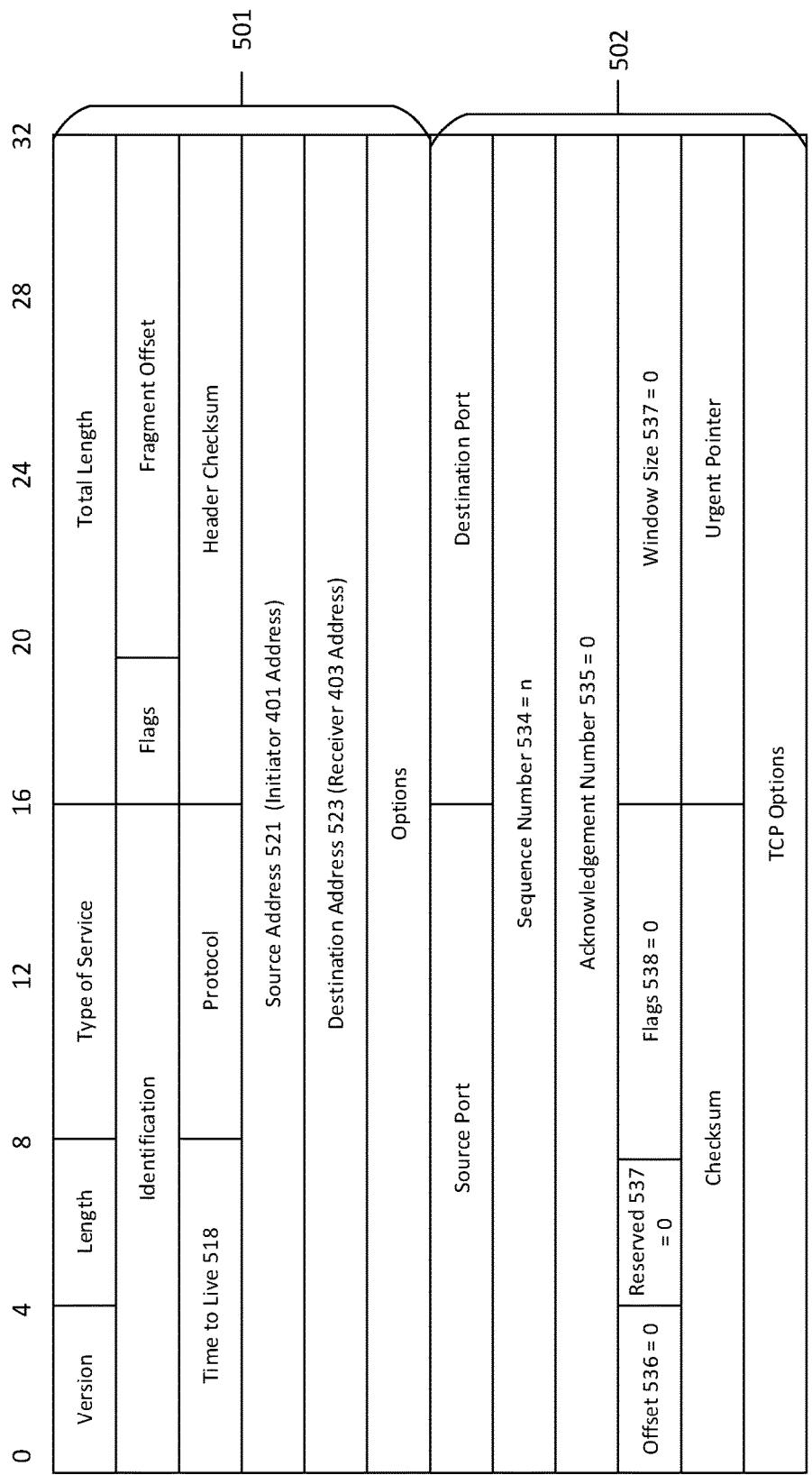
FIGS. 5A-5D are example representations of diagnostic packets.
Figure 5B:
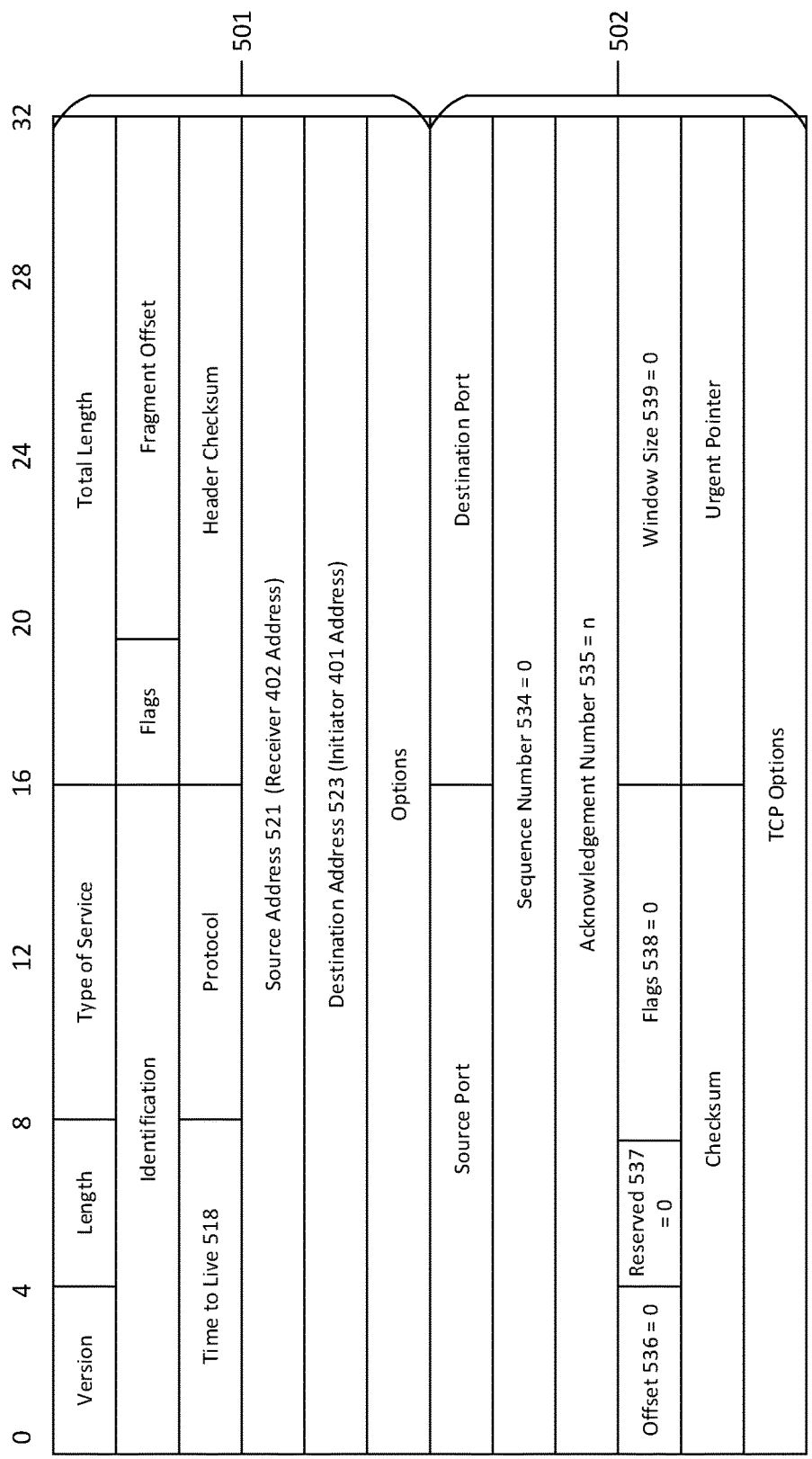
Figure 5C:
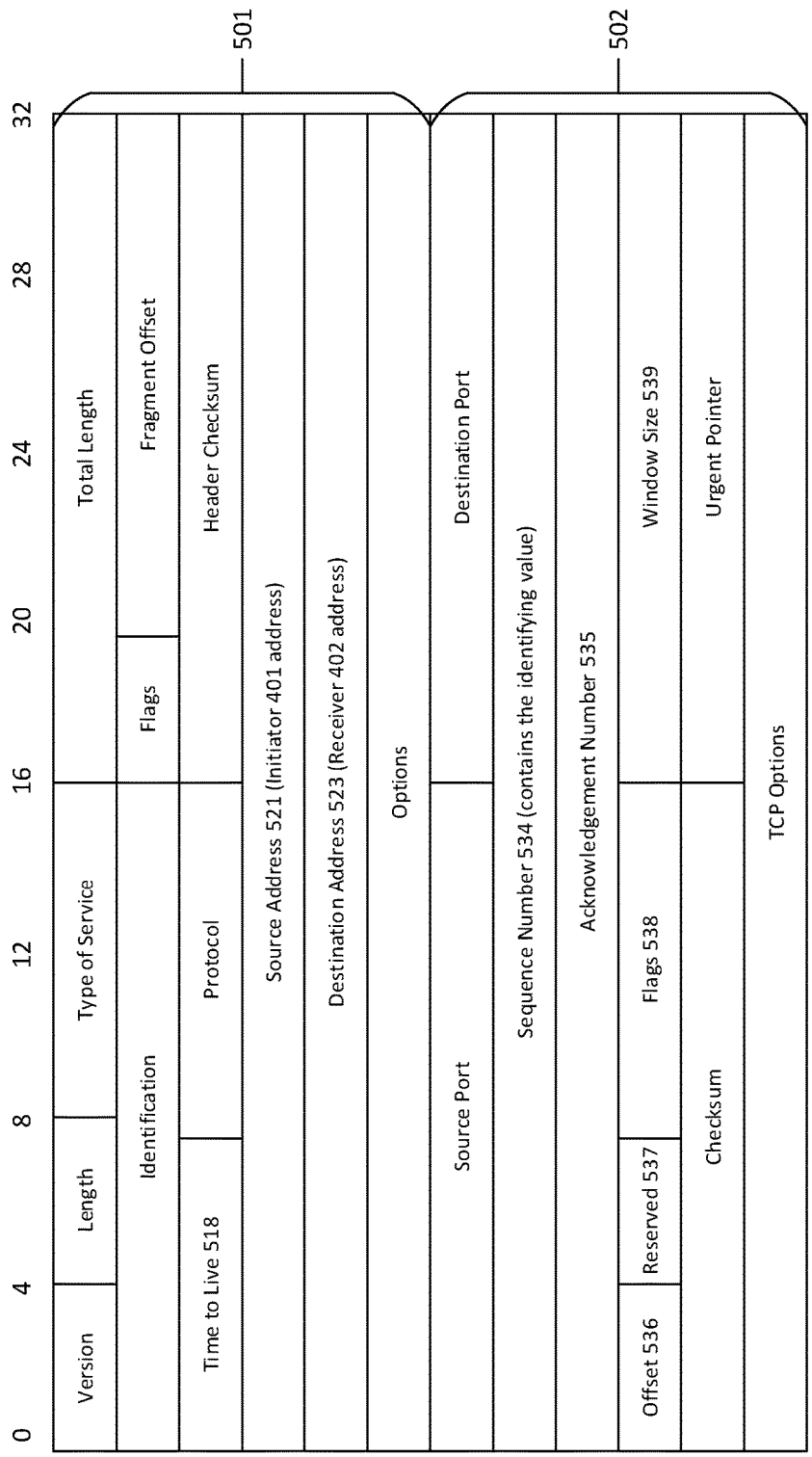

FIGS. 5A-5C are example TCP packets that include a TCP payload 502. The TCP payload includes a 32-bit sequence number 534, a 32-bit acknowledgement number 535, a 4-bit offset value 536, a 6-bit reserved value 537, a 6-bit value containing flags 538, and a 16-bit window size value 539. The sequence number 534 indicates the position of a particular packet in a sequence of packets and the acknowledgement number 535 indicates the sequence number 534 of an original packet whose receipt is being acknowledged by the particular packet.

FIG. 5A depicts an example TCP end-to-end diagnostic packet. The source address field 521 of the packet is the IP address of a source host associated with a monitored network flow, while the destination address field 522 of the packet is the IP address of a destination host associated with the monitored network flow. The sequence number 534 of the packet can distinguish the packet in a group of packets and the acknowledgement number of the packet is zero to indicate that the packet is not an end-to-end response packet. The offset value 536, the reserved value 537, the flag bits 538, and the window size 539 of the packet are set to zero to indicate that the packet is a diagnostic packet.

FIG. 5B depicts an example TCP end-to-end response packet. The source address field 521 of the packet is the IP address of a destination host associated with a monitored network flow, while the destination address field 522 of the packet is the IP address of a source host associated with the monitored network flow. The sequence number 534 of the packet is zero because the packet is not an end-to-end diagnostic packet and the acknowledgement number 535 of the packet is set to the sequence number 534 of an end-to-end diagnostic packet that the end-to-end response packet acknowledges. The offset value 536, the reserved value 537, the flag bits 538, and the window size 539 of the packet are set to zero to indicate that the packet is a diagnostic packet.

FIG. 5C depicts an example TCP trace diagnostic packet. The source address field 521 of the packet is the IP address of a source host associated with a monitored network flow, while the destination address field 522 of the packet is the IP address of a destination host associated with the monitored network flow. The TTL field 518 of the packet is a value that, if decremented at each hop, will reach zero at a particular hop that the packet seeks to trace. The sequence number 534 of the packet includes an identifying value for the packet. The offset value 536, the reserved value 537, the flag bits 538, and the window size 539 of the packet can be zero to indicate that the packet is a diagnostic packet. A number of different TCP trace diagnostic packets can be sent with different TTL values to capture successive hops in the path of the flow.

Figure 5D:
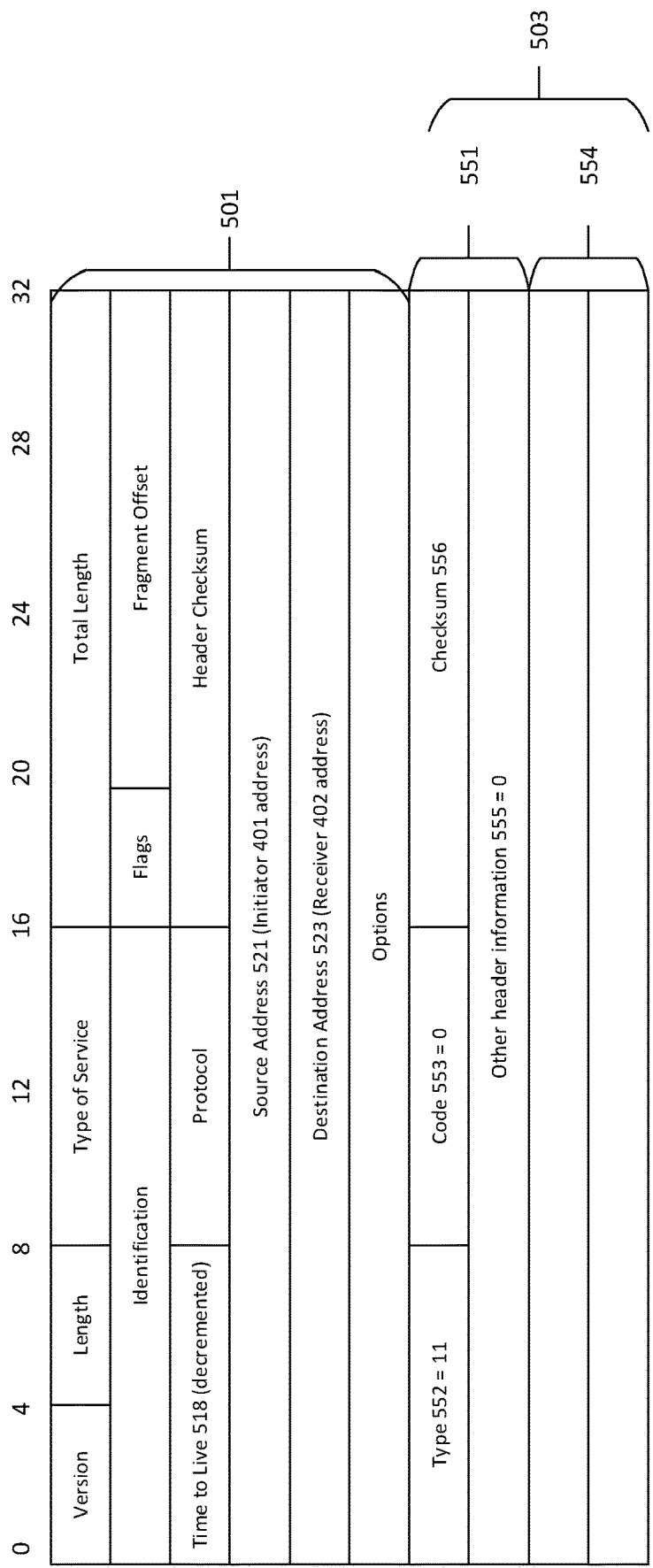

FIG. 5D depicts an example trace response packet in the form of an ICMP time-exceeded message. The ICMP payload of the packet includes an ICMP header 551 and an ICMP body 554. The ICMP header 551 includes an 8-bit type field 552 and an 8-bit code field 553 set to eleven and zero respectively to indicate that the ICMP message is a time exceeded message, a 16-bit checksum field 556, and a 32-bit field with other header information 555. The ICMP body 554 can include a portion, e.g., the first 32 bits, of the packet that triggered the ICMP message. If the triggering packet is a TCP trace diagnostic packet as depicted in FIG. 5C, an identifying number in the sequence number field 534 of the triggering packet will also appear in the ICMP body 554 of the trace response packet. As a result, the origin of each received ICMP time exceeded message can be determined from the identifying information in the returned portion of the packet.

Figure 6:
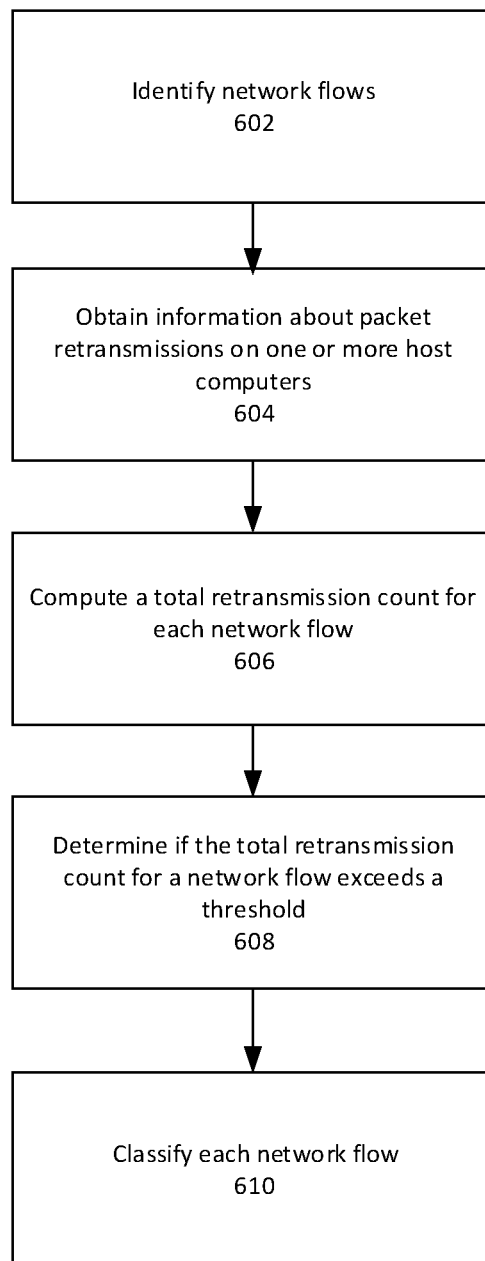
FIG. 6 is a flow diagram of an example process for classifying network flows based on re-transmission counts.

FIG. 6 is a flow diagram of an example process 600 for classifying network flows based on re-transmission counts. The process 600 will be described with respect to a system that can perform the process 600, e.g., the network diagnostic engine 101 of FIG. 1.

The system identifies one or more network flows (602) and obtains information about re-transmission of packets associated with the network flows from one or more hosts (604).

In some implementations, the system generates information about re-transmission of packets associated with the network flows by tracing, on each host of the one or more hosts, calls to a kernel function used for packet re-transmission and then mapping each call to corresponding identifying information in accordance with a network protocol. For example, the system can trace calls to the tcp_retransmit_skb( ) function used for TCP packet re-transmission in Linux. Subsequently, the system traces are passed to one or more data structures used by the tcp_retransmit_skb( ) function, e.g., struct sock and struct sk_buff data structures, using Linux's tracer function ftrace. The system then maps each call to corresponding TCP-IP flow information using the map provided by the pseudo file procfs:/proc/net/tcp.

In some implementations, the system traces calls to the tcp_retransmit_skb( ) function using a tracer function developed based on the Kprobe mechanism in Linux. This tracer function can directly return the TCP-IP flow information associated with a call to the tcp_retransmit_skb( ) function and thus remove the need for using procfs:/proc/net/tcp.

The system computes a total retransmission count for each network flow, e.g., over a specified time window, of the one or more network flows (606) and determines if that count exceeds a threshold (608). The threshold can be any suitable value, such as one.

The system then classifies each network flow (610) based on whether the total retransmission count for the network flow exceeds the threshold. For example, if the system determines that the total retransmission count for the network flow exceeds the threshold, the system can classify the network flow as having a high retransmission count. If the system determines that the total retransmission count for the network flow does not exceed the threshold, the system can classify the network flow as not having a high retransmission count.

Figure 7:
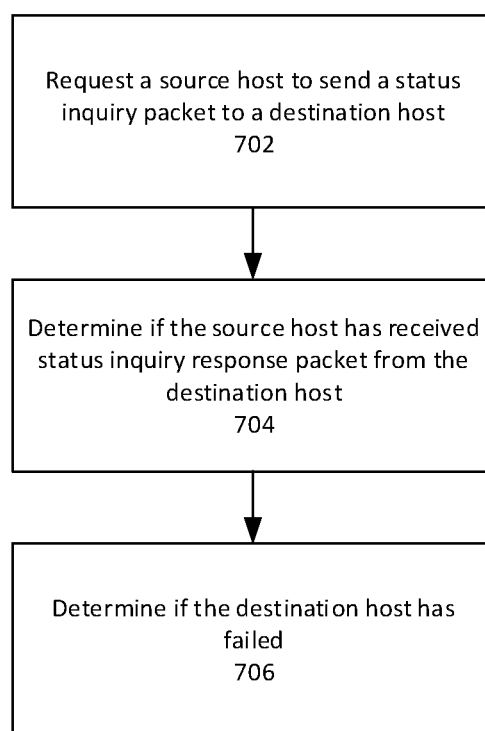
FIG. 7 is a flow diagram of an example process for detecting host failures.

FIG. 7 is a flow diagram of an example process 700 for detecting host failures. The process 700 will be described with respect to a system that can perform the process, e.g., the network diagnostic engine 101 of FIG. 1.

The system requests that a source host sends a status inquiry packet to the destination host (702). In some implementations, the status inquiry packet is a packet, e.g., a UDP packet, to a port of the destination host that by convention is not listened to by any application on a host, e.g., ports with port number equal to or greater than 33434. The source host may send the status inquiry packet to the destination host over a path other than the path for transmitting packets of a network flow from the source host to the destination host.

The system determines if the source host has received a status inquiry response packet from the destination host (704). The status inquiry response packet indicates that the destination host has received the status inquiry packet. In some implementations, when the status inquiry packet is a packet to a port of the destination host that by convention is not listened to by any application on a host, the status inquiry response packet is an ICMP port-unreachable packet. The ICMP port-unreachable packet can copy identifying information about the status inquiry packet in its ICMP body if such identifying information is supplied in a portion, e.g., the first 64 bits, of the status inquiry packet.

The system determines whether the destination host has failed (706) based on whether the source host has received the status inquiry response packet. If the system determines that the source host has not received the status inquiry response packet, the system determines that the destination host has failed. If the system determines that source host has received the status inquiry response packet, the system determines that the destination host has not failed.

Figure 8:
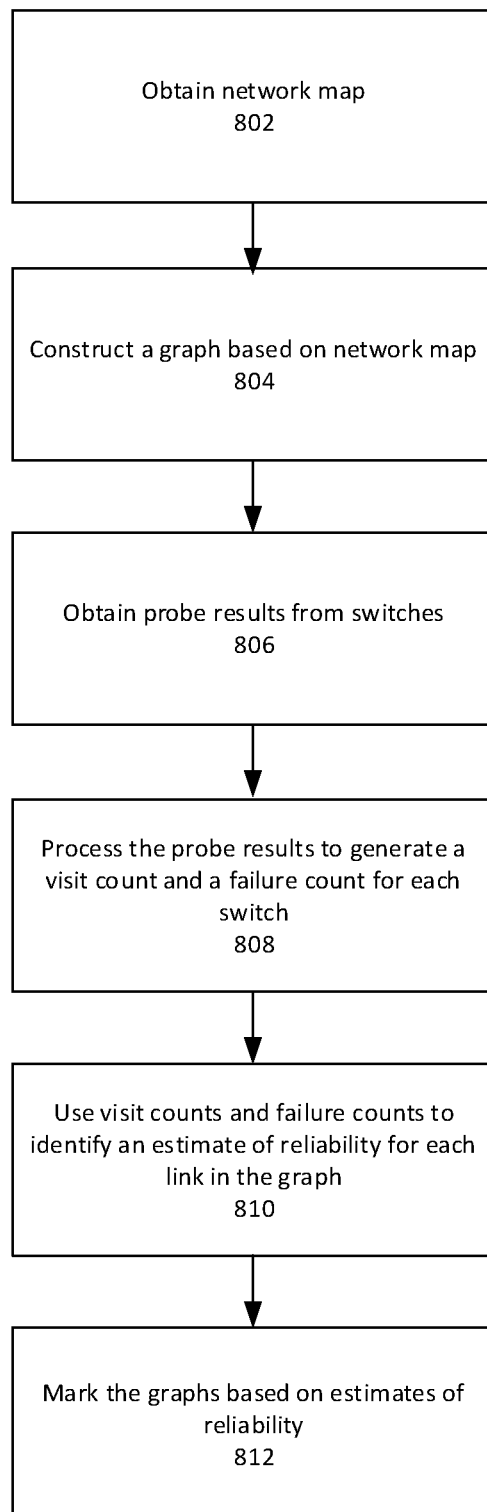
FIG. 8 is a flow diagram of an example process for generating a graph with network link reliability information.

FIG. 8 is a flow diagram of an example process for generating a graph with network link reliability information. The process can be performed by a system of one or more computers, e.g., the network diagnostic engine 101 of FIG. 1.

The system obtains a map of a computer network, e.g., from a database including information about network devices, (802) and constructs a graph based on the network map (804). The graph includes edges corresponding to links in the computer network, nodes corresponding to switches and optionally hosts in the computer network, and edge weights corresponding to an estimate of reliability of the link.

The system obtains probe results from switches in the computer network (806) and processes the probe results to determine a visit count and a failure count for each link in the graph (808).

In some implementations, the system processes probe results to generate a probe record corresponding to each probing task of a monitored network, e.g., using end-to-end probing, trace probing, or both. The probe record for each probing task shows the hops that a diagnostic packet has successfully reached during the probing task. The system then processes probe records to determine visit counts and failure counts for links in the computer network. Each time a probe record indicates that a diagnostic packet has reached a switch or a host through a link, the system increments the visit count for the link. Each time a probe record indicates that a diagnostic packet has reached a particular switch as its last hop but has not reached its intended destination, the system increments the failure count for every link between the last hop and the intended destination.

The system uses the visit count and failure count for each link to determine an estimate of reliability for each link (806). The system will decrease the estimate of reliability of a link based on the failure count for the link. However, the system can assign a low estimate of reliability to a link even when the link has a low failure count, for example if a link has a visit count that is higher than a threshold indicating likely congestion of the link and/or if the link has a visit count that is lower than a threshold indicating likely unreachability of link. Example techniques for assigning a low estimate of reliability to a link even when the link has a low failure count are described above with reference to the false positive detector 223 in FIG. 2.

The system then marks the graph based on estimates of reliability for each link (808). In some implementations, the system assigns a weight or a label to an edge in the graph corresponding to a link based on the estimate of the probability of the link. For example, the system assigns a lower weight to an edge corresponding to a link to indicate that the link has a lower estimate of probability.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable destination apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) destination, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

identifying a network flow of packets in a computer network between a source and a destination, wherein the network flow corresponds to a particular path in the computer network between the source and the destination, the particular path being defined in part by the source and destination identifiers and comprising a plurality of network components including one or more network devices coupled by one or more links; and in response to a determination that there is no end-to-end connectivity between the source and the destination along the particular path, determining whether a network component of the particular path in the network flow has failed comprising:

requesting that the source transmit a respective trace diagnostic packet to each network device along the same particular path of the network flow, wherein each trace diagnostic packet is configured to follow the particular path of the network flow and has a particular value in a time-to-live field such that the trace diagnostic packet will expire at a different network device in the particular path, which causes a corresponding network device to send a time exceeded message in response to that trace diagnostic packet, and a packet identifier inserted into a field located within a first plurality of bytes of the trace diagnostic packet, and wherein the time exceeded message includes a portion of the trace diagnostic packet that includes the packet identifier inserted into the first plurality of bytes of the trace diagnostic packet; and determining whether at least one network component that is part of the particular path of the network flow has failed based on results of the trace diagnostic packets.

2. The method of claim 1, wherein determining whether at least one network component has failed comprises:
   determining whether the source has received a time exceeded message from a particular network device;
   in response to determining that the source has received the time exceeded message from a particular network device, determining that the particular network device is operational from the source along the particular path; and
   in response to determining that the source has not received the time exceeded message from a particular network device, determining that the particular network device has failed from the source along the particular path.

3. The method of claim 1, wherein the packet identifier of the trace diagnostic packet is inserted within a sequence number field of a TCP packet.

4. The method of claim 1, wherein the packet identifier of the trace diagnostic packet is inserted within a length field of a UDP packet.

5. The method of claim 1, wherein the time exceeded message is an internet control message protocol message that contains a collection of bits of the trace diagnostic packet that triggered the time exceeded message.

6. The method of claim 1, wherein the time-to-live field of the trace diagnostic packet includes an integer number that is decremented at each network device along the particular path of the network flow such that the time exceeded message is sent by the network device when the integer number is decremented to zero.

7. The method of claim 1, wherein the determination that there is no end-to-end connectivity between the source and the destination comprises:
   performing a first probe to determine whether there is end-to-end connectivity between the source and the destination including requesting that the source transmit an end-to-end diagnostic packet to the destination, wherein the end-to-end diagnostic packet includes information comprising a source identifier field and a destination identifier field that include identifiers for the source and destination, respectively, that match the packets in the network flow between the source and destination such that one or more network devices in the computer network forward the end-to-end diagnostic packet on the particular path of the network flow.

8. A system comprising:
   one or more computers and one or more storage devices storing instructions that are operable, when executed by the one or more computers, to cause the one or more computers to perform operations comprising:
      identifying a network flow of packets in a computer network between a source and a destination, wherein the network flow corresponds to a particular path in the computer network between the source and the destination, the particular path being defined in part by the source and destination identifiers and comprising a plurality of network components including one or more network devices coupled by one or more links; and
      in response to a determination that there is no end-to-end connectivity between the source and the destination along the particular path, determining whether a network component of the particular path in the network flow has failed comprising:
         requesting that the source transmit a respective trace diagnostic packet to each network device along the same particular path of the network flow, wherein each trace diagnostic packet is configured to follow the particular path of the network flow and has a particular value in a time-to-live field such that the trace diagnostic packet will expire at a different network device in the particular path, which causes a corresponding network device to send a time exceeded message in response to that trace diagnostic packet, and a packet identifier inserted into a field located within a first plurality of bytes of the trace diagnostic packet, and wherein the time exceeded message includes a portion of the trace diagnostic packet that includes the packet identifier inserted into the first plurality of bytes of the trace diagnostic packet; and
         determining whether at least one network component that is part of the particular path of the network flow has failed based on results of the trace diagnostic packets.

9. The system of claim 8, wherein determining whether at least one network component has failed comprises:
   determining whether the source has received a time exceeded message from a particular network device;
   in response to determining that the source has received the time exceeded message from a particular network device, determining that the particular network device is operational from the source along the particular path; and
   in response to determining that the source has not received the time exceeded message from a particular network device, determining that the particular network device has failed from the source along the particular path.

10. The system of claim 8, wherein the packet identifier of the trace diagnostic packet is inserted within a sequence number field of TCP packet.

11. The system of claim 10, wherein the packet identifier of the trace diagnostic packet is inserted within a length field of a UDP packet.

12. The system of claim 8, wherein the time exceeded message is an internet control message protocol message that contains a collection of bits of the trace diagnostic packet that triggered the time exceeded message.

13. The system of claim 8, wherein the time-to-live field of the trace diagnostic packet includes an integer number that is decremented at each network device along the particular path of the network flow such that the time exceeded message is sent by the network device when the integer number is decremented to zero.

14. The system of claim 8, wherein the determination that there is no end-to-end connectivity between the source and the destination comprises:
   performing a first probe to determine whether there is end-to-end connectivity between the source and the destination including requesting that the source transmit an end-to-end diagnostic packet to the destination, wherein the end-to-end diagnostic packet includes information comprising a source identifier field and a destination identifier field that include identifiers for the source and destination, respectively, that match the packets in the network flow between the source and destination such that one or more network devices in the computer network forward the end-to-end diagnostic packet on the particular path of the network flow.

15. One or more non-transitory computer storage media encoded with computer program instructions that when executed by one or more computers cause the one or more computers to perform operations comprising:
- identifying a network flow of packets in a computer network between a source and a destination, wherein the network flow corresponds to a particular path in the computer network between the source and the destination, the particular path being defined in part by the source and destination identifiers and comprising a plurality of network components including one or more network devices coupled by one or more links; and
- in response to a determination that there is no end-to-end connectivity between the source and the destination along the particular path, determining whether a network component of the particular path in the network flow has failed comprising:
  - requesting that the source transmit a respective trace diagnostic packet to each network device along the same particular path of the network flow, wherein each trace diagnostic packet is configured to follow the particular path of the network flow and has a particular value in a time-to-live field such that the trace diagnostic packet will expire at a different network device in the particular path, which causes a corresponding network device to send a time exceeded message in response to that trace diagnostic packet, and a packet identifier inserted into a field located within a first plurality of bytes of the trace diagnostic packet, and wherein the time exceeded message includes a portion of the trace diagnostic packet that includes the packet identifier inserted into the first plurality of bytes of the trace diagnostic packet; and
  - determining whether at least one network component that is part of the particular path of the network flow has failed based on results of the trace diagnostic packets.

16. The non-transitory computer storage media of claim 15, wherein determining whether at least one network component has failed comprises:
- determining whether the source has received a time exceeded message from a particular network device;
- in response to determining that the source has received the time exceeded message from a particular network device, determining that the particular network device is operational from the source along the particular path; and
- in response to determining that the source has not received the time exceeded message from a particular network device, determining that the particular network device has failed from the source along the particular path.

17. The non-transitory computer storage media of claim 15, wherein the packet identifier of the trace diagnostic packet is inserted within a sequence number field of a TCP packet.

18. The non-transitory computer storage media of claim 17, wherein the packet identifier of the trace diagnostic packet is inserted within a length field of a UDP packet.

19. The non-transitory computer storage media of claim 15, wherein the time exceeded message is an internet control message protocol message that contains a collection of bits of the trace diagnostic packet that triggered the time exceeded message.

20. The non-transitory computer storage media of claim 15, wherein the time-to-live field of the trace diagnostic packet includes an integer number that is decremented at each network device along the particular path of the network flow such that the time exceeded message is sent by the network device when the integer number is decremented to zero.

21. The non-transitory computer storage media of claim 15, wherein the determination that there is no end-to-end connectivity between the source and the destination comprises:
- performing a first probe to determine whether there is end-to-end connectivity between the source and the destination including requesting that the source transmit an end-to-end diagnostic packet to the destination, wherein the end-to-end diagnostic packet includes information comprising a source identifier field and a destination identifier field that include identifiers for the source and destination, respectively, that match the packets in the network flow between the source and destination such that one or more network devices in the computer network forward the end-to-end diagnostic packet on the particular path of the network flow.

* * * * *